Feb. 4, 1969    R. C. KLINGER ET AL    3,425,266

LOW LEVEL VIBRATION TEST SYSTEM

Filed Aug. 11, 1966

INVENTORS
RICHARD C. KLINGER
MARVIN A. KOLLODGE
BY *Harry M. Saraporty*
*Edward J. Kelly* *Herbert Berl*
*F. S. Dubroff*   ATTORNEYS

United States Patent Office 3,425,266
Patented Feb. 4, 1969

3,425,266
LOW LEVEL VIBRATION TEST SYSTEM
Richard C. Klinger and Marvin A. Kollodge, Minnetonka, Minn., assignors, by mesne assignments, to the United States of America as represented by the Secretary of the Army
Filed Aug. 11, 1966, Ser. No. 572,171
U.S. Cl. 73—71.6   5 Claims
Int. Cl. G01n 29/00; G01m 7/00

ABSTRACT OF THE DISCLOSURE

A test system relatively free of ambient vibrational disturbances for subjecting objects to a predetermined low-level vibration environment comprising a suspended platform, a loud-speaker mounted thereon and having a test platform attached to its speaker cone for supporting the test object, signal generating means for exciting said loud-speaker, and sensing means for detecting the vibrations at the test platform.

---

Figure 1:
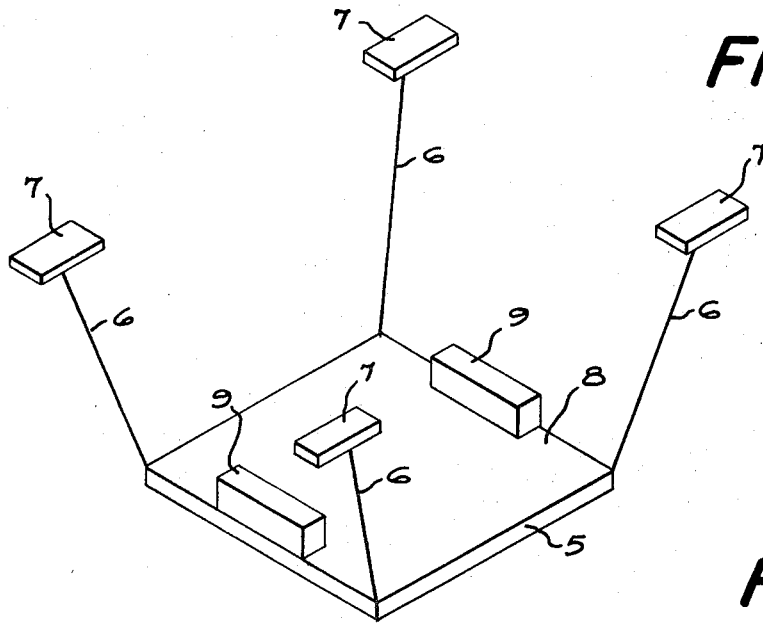

The present invention relates to a vibration test system used to produce a calibrated vibration environment about an object or device to be tested for performance under predetermined vibrational conditions. More particularly, the present invention relates to a vibration test system for producing a calibrated low-level vibration environment about relatively small or light objects or devices to be tested for vibrational operation at predetermined low frequencies. Such devices demand a different kind of vibration test system than has heretofore been available to overcome certain problems associated with low-level vibration systems. These problems involve:

(1) Protection against the ambient vibration level which is always present and which in the present application cannot be permitted to reach the test device.

(2) Attaining the high signal-to-noise ratio required for excitation of a test platform, table or the like, on which such devices are tested for vibration.

(3) Regarding a low-cost construction which is desirable but not readily attainable test systems of this type due to the light weight of the objects to be tested and the care with which the apparatus must be built.

The primary object of this invention, therefore is to provide a vibration test system of the low-level vibration type for testing small and relatively-light-weight devices and objects, and which overcomes the above problems efficiently.

It is a further object of this invention to provide an improved low-level vibration test system in which the operating elements are more effectively isolated from ambient vibration levels than has heretofore been possible, and which operate with efficient and relatively light-weight driving elements.

It is also a further and important object of this invention to provide a low-level vibration test system and associated instrumentation which are adapted for operation at relatively low frequency ranges with a rated accuracy of better than one microinch, while being isolated from the ambient vibration level to a relatively high degree approaching the zero level.

It is also a further object of this invention to provide a low-level vibration test system with improved mounting and driving means for applying vibrational action to a test object or device and which does not load the test table or platform nor modify the vibratous action applied to the object or device under test.

Further and salient features of the system of the present invention in accordance with the foregoing objects are:

(1) Double amplitude of vibration as low as 10 microinches.

(2) Frequency range of 5 to 300 c.p.s. (below 5 c.p.s. if additional driving power is provided).

(3) Readout accuracy to better than one microinch.

(4) Isolation from ambient vibration level.

(5) High signal-to-noise ratio for a system mounting plate or table excitation.

(6) Capable of vibrating test items weighing down to below 8 ounces for example.

(7) Selectable vibration waveform and frequency.

In accordance with one form of the invention, the vibratory system consists of a relatively-large vibration transducer of the loud-speaker type with a light-weight platform or table secured to the speaker cone for mounting the device or object to be tested. The entire assembly, including the system mounting platform or table is suspended by nylon cords that provide isolation from ambient vibration, and the speaker is driven directly from a function generator. The amplitude and frequency of vibration is measured by a sensing head physically separated from the vibrating platform or table so that ambient vibrations do not affect measurement.

By using a speaker as the vibration transducer, the entire system may be suspended to achieve the isolation from ambient vibrations as above referred to. In addition, a vibration transducer of the loud-speaker type, because of its relatively-light voice-coil mass, does not require a large driving signal at the higher frequencies. As a result, a high signal-to-noise ratio can be maintained over the entire desired frequency range.

Further, and in accordance with the invention, the sensing head or element operates on the principle of a short-circuited turn with respect to the vibrating plate moving in the magnetic field of an energized coil. Thus the sensing head may be spaced from the vibrating plate and will measure low frequency vibrations in the region of micro-inch amplitudes because it is not dependent upon a moving mass for its operation. The signal from the sensing head may be detected, amplified and displayed on an oscilloscope.

The invention will further be understood from the following description, when considered with reference to the accompanying drawing, and its scope is pointed out in the appended claims.

In the drawings,

FIG. 1 is a diagrammatic representation of a portion of the system of the present invention showing certain operating elements thereof arranged in accordance with the invention.

Figure 2:
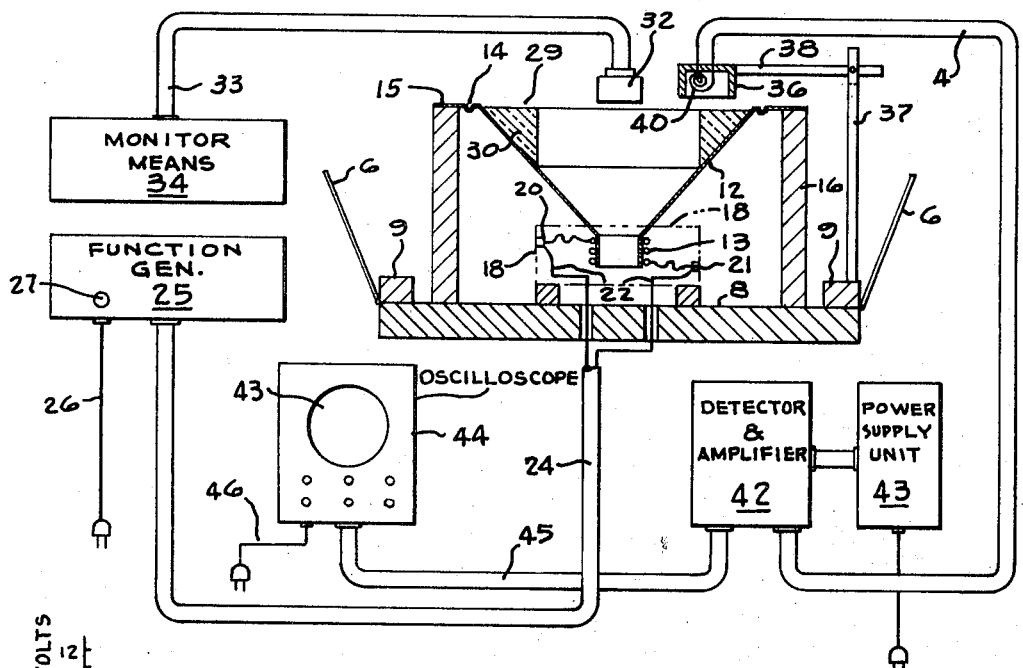
Figure 3:
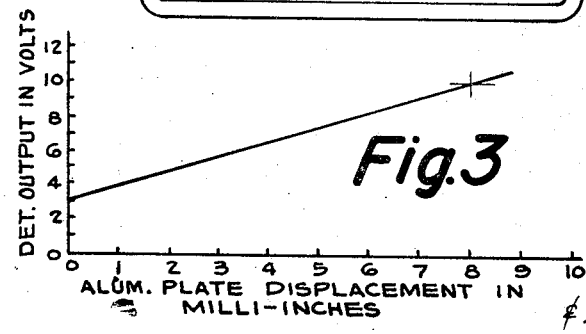

FIG. 2 is a further diagrammatic representation of a complete test system in accordance with the invention, showing the apparatus of FIG. 1 and associated elements in elevation and partly in cross-section, together with circuit elements connected therewith for deriving the signal output therefrom, and FIG. 3 is a graph showing a curve illustrating a certain operating characteristic of the apparatus of FIG. 2 in accordance with the invention.

Referring to the drawing, wherein like reference characters refer to like elements throughout the various figures, and referring particularly to FIG. 1, 5 is a system mounting platform or table of rectangular form, suspended at a plurality of points, such as its four corners for example, on four nylon support cords 6 from elevated and fixed ceiling anchor plates or elements 7. The system mounting platform 5 provides a flat level test area or surface 8 on opposite sides of which are mounted balancing weights 9 which may be moved and fixed to provide a precisely level test area with the nylon cords equally stressed.

Referring now to FIG. 2 along with FIG. 1, the planar mounting platform 5 is shown in cross section, and mounted on the test area or surface 8 is a presently preferred form of vibration transducer which is a loud speaker of the woofer type. This may be a 15-inch woofer speaker, having the usual tapered cone element 12 carries a voice coil 13 at the inner end thereof, and having the usual fold annular ring of flexibility 14 between it and the fixed outer rim 15 which is carried by the frame 16 of the loud speaker. The latter is mounted on the platform 5 as indicated, as is also a conventional magnectic field structure 18 for the voice coil. Accordingly, the details of the magnetic field structure are not shown in order to show the connections to the voice coil more clearly at the terminals 20 and 21 therefor. To these terminals are connected a pair of signal input leads in a flexible and relatively-light, thin cord 24. This card is connected to a function generator 25 which is energized from any suitable power source through the usual plug-in cord 26 and is controlled in operation by a control switch 27. In the present example, the function generator 25 may be considered to be an audio-frequency oscillator capable of delivering audio-frequency signals in a low-frequency range, for example from 5 to 360 cycles or more per second.

The vibrational test platform or table on which devices to be tested are mounted, is a circular, thin, and preferably light-weight plate 29 connected with the speaker cone 12 to move therewith. Preferably, the plate 29 is of aluminum and is cemented to a tapered annular ring of porous, light-weight ceramic material, such as Styrofoam, indicated at 30. The Styrofoam ring is preferably poured into a form (not shown) inserted in the speaker cone and allowed to adhere to the cone, after which the form is removed to provide the ring as indicated at 30. An epoxy cement such as Shell Chemical Epon 934, may be used to cement the aluminum plate 29 to the Styrofoam ring 30. This cement is used because it does not chemically attack the Styrofoam.

A device to be tested as indicated at 32, of the electronic type for example, is mounted on the vibration plate 29 and, if desired, may be connected through a suitable output connection 33 with whatever monitor means such a device may require, as indicated at 34. In some cases, no output device is provided, of course, as the test device 32 may be entirely mechanical and need not be monitored electrically.

Using the loud-speaker as the vibration transducer allows the entire system to be suspended to achieve isolation from the ambient vibration. Thus the entire assembly, including the system mounting plate 5, is suspended by the nylon cords 6, the nylon type being selected because of its elasticity without undue springiness. Other isolation means, such as foam-rubber cushions, have been tried but have proved inadequate. As an example, under typical test conditions, foam rubber may reduce the ambient level transmitted to the system to approximately 70 to 80 microinches as compared to 5 to 10 microinches for the nylon cords.

Further with regard to a loud-speaker type of vibration transducer, a loud speaker, because of its relatively light voice coil mass, does not require a large driving signal at the higher frequencies. As a result, a high signal-to-noise ratio can be maintained over the entire frequency range. Furthermore, the loud-speaker type of drive or transducer is readily obtainable at relatively low cost.

The amplitude and frequency of vibration imparted to the test platform or plate 29 is measured by a sensing head 36 physically separated from the vibration plate 29 but also mounted on the surface 8 so that the ambient vibrations will not affect the measurements. The sensing head 36 is mounted on and supported by the system mounting platform 5 through a vertical post 37 on the platform carrying an adjustable suspension arm 38 which is attached to and supports the sensing head 36 as indicated in FIG. 2.

The sensing head 36 was selected after an extensive investigation of various methods that might be used to measure low frequency vibrations in the region of microinch amplitudes. It will sense such vibrations because it is not dependent upon a moving mass for its operation. The sensing head operates on the principle of an electrical short-circuited winding turn, which is the vibrating plate 29, moving the magnetic field of an energized pancake-type coil 40 within the sensing head 36 positioned relatively close and in parallel relation to the metallic plate or table 29 in operation. Energizing current is applied to the coil through supply leads 4 connected therewith and leading from a suitable detector and amplifier unit 42 for which a power supply unit 43 is provided. In operation, the change in coil loading caused by the moving plate or table 29 is related to the distance traveled thereby, and the amplitude and frequency of this loading effect is converted to an electrical signal output through the detector and amplifier 42 and is displayed on the screen 43 of an oscilloscope 44 with which the detector and amplifier unit is connected through a circuit connection lead 45. As it is customary the oscilloscope and power supply unit are both adapted to be energized from any electrical wall outlet through respective supply cords indicated at 46 and 47.

While the present function generator 25 may be considered to be an audio-frequency oscillator adapted for driving the vibrating system over a frequency range of from 5 to 300 cycles per second, for example, frequencies above 300 cycles per second may be provided for the system by adding an amplifier for the driving signal and by locating the metallic plate of table 29 closer to the voice coil 13 of the speaker cone so that a smaller plate may be used to reduce the weight to be vibrated. It may be noted that the use of a loud-speaker as a vibration transducer has two distinct advantages; one of which has heretofore been indicated, and which may be summarized as follows:

(1) The transducer is small and light enough so that it can be suspended by elastic cords which provide isolation from ambient vibration.

(2) Because of its light voice-coil mass, a speaker does not require a large driving signal at the higher frequencies.

The first advantage above may be evident, but further explanation may be presented for the second advantage listed. The use of a low mass vibration system permits the use of low-power amplifiers with their inherent better signal-to-noise ratio. In some applications of the system, the amplifiers may be omitted and consequently the noise in the system is then mainly limited to that associated with the signal generator 25. As a result, even at low frequencies where the requirement for driving signal is small, the signal-to-noise ratio remains high.

Referring now to FIG. 3 along the preceding figures, the graph shows a calibration curve 50 plotted between detector output volts and the plate displacement in milli-inches. Data for this curve was obtained by making static measurements of the vertical displacement of the aluminum plate or table 29 for corresponding voltage values at the output connection 45 of the detector and amplifier unit 42. An output of three volts was selected as a starting point for calibration measurements in order to use the straight line portion of the curve 50 for the distance detection. The operating point for zero displacement of the aluminum plate during vibration was then chosen at a convenient point such as 6 volts output on the straight line portion of the curve 50.

With this system readout accuracy to better than 1 microinch is provided and there is no moving mass within the measuring device for operation. Furthermore, readout is unaffected by ambient vibration. This later feature a distinct advantage not offered by conventional measuring devices such as accelerometers. As indicated in FIG. 2, the sensing head and the vibrating system are all secured to the same suspended system mounting platform or base so that ambient vibrations will not affect the measuring system. With the sensing head isolated in this manner and with the calibration curve of FIG. 3 readout is possible to less than 1 microinch.

We claim:

1. A low-level vibration test system comprising in combination, a vibration transducer of the loud-speaker type having a light-weight movable cone and a driving voice coil therefor, a mounting platform for said system providing planar mounting surface, a plurality of non-metallic suspension cords having a controlled degree of elasticity connected with said mounting platform at spaced points to hold it in level suspension, means for mounting said vibration transducer on said platform with the axis of the speaker cone normal to the plane of said mounting surface and extending upwardly from the voice coil, a light-weight and rigid annular ring of porous plastic material mounted in and secured to the speaker cone, a relatively-thin circular plate of light-weight conductive material mounted on and secured to said annular ring as a vibratile test table for an object or device to be tested and being thereby movable with the speaker cone in operation, a sensing head mounted on said platform and held in close spaced relation to said plate to sense the vibrations thereof in operation, an electrical pickup coil within the sensing head which is inductively loaded by the presence of an external shorted secondary element provided by the plate, the coil loading being proportional to the distance from the coil to the plate, whereby as the plate is vibrated by the speaker cone the output voltage is proportional to the amplitude of vibration and the frequency of the output voltage is the same as the frequency of vibration of the cone, means including an oscilloscope connected with said pickup coil for detecting and visibly displaying an output signal from said coil in response to operation of the speaker cone, and a function generator device connected with said voice coil to apply signals thereto in a relatively low frequency range and at low power levels.

2. A low-level vibration test system as defined in claim 1, wherein the supporting cords for the mounting platform include nylon material providing elasticity without undue springiness and effectively isolating the mounting platform from ambient vibration, and wherein the vibration transducer is a loud-speaker mechanism of the woofer type having a relatively large cone with high compliance and limited frequency response and a free air resonance below 100 cycles per second.

3. A low-level vibration test system comprising in combination a nylon-cord-suspended flat mounting platform having a plurality of movable elements for effecting a leveling thereof in response to stressing of said cords, a loud-speaker of the woofer type mounted on and secured to said platform with the cone element thereof inverted and projecting upwardly from said platform, a vibratile plate of light-weight electrically conductive material mounted in and connected with said cone element normal to the axis thereof, an annular ring of light-weight rigid plastic material providing a motion transmitting connection between said plate and said cone, the loudspeaker unit is a vibration transducer being relatively small and relatively light-weight sufficient to permit the entire system to be suspended on said cords, thereby to achieve isolation from ambient vibration, and said speaker further having a light-weight voice coil requiring a relatively low amplitude driving signal and thereby improving the inherent signal-to-noise ratio of said system due to the low amplification required, a sensing head including a flat pickup coil mounted on said platform and suspended in close spaced parallel relation to said vibrating metallic plate to derive a signal therefrom in movement due to the short-circuited-turn loading of the coil, detecting and amplifying means connected with said coil to receive and translate the signal output therefrom, an an oscilloscope device connected with said detector and amplifier unit for driving a visual display of the signal output from said coil, and means for applying low-frequency signals to said speaker voice-coil to vibrate said test table and a device or object to be tested thereon.

4. A low-level electro-mechanical vibration test system adapted for producing controlled low-level vibrations in a microinch range and at relatively low frequency, said system comprising a planar mounting platform, means including a plurality of non-metallic resilient support cords connected to hold said platform in suspension and substantially level, a vibratable test table comprising a thin flat plate of light-weight metal, a loud-speaker type mechanism having a vibratile voice coil and attached cone element of relatively low mass, a body of light-weight plastic material providing a transmitting connection between the outer peripheral portion of the cone and said plate, means for mounting said speaker mechanism on said platform with the cone and voice-coil axis normal to the plane thereof, means connected with the voice-coil to apply thereto low-amplitude signals at relatively low frequencies, a pickup coil disposed close to but out of contact with the outer surface of said test table plate for inductive coupling therewith, and means including an oscilloscope device connected to receive and translate the signal output from said coil into corresponding visible vibration indications.

5. A low-level vibration test system comprising in combination a loud-speaker-type vibration translating device having a voice coil and a drive cone element of relatively light-weight, and a signal generating means connected with said voice coil to apply signals of relatively low frequency thereto, a planar mounting platform for said device to which it is attached with the voice coil and cone axis substantially normal to the plane of said platform, non-metallic resilient cord suspension means connected with said platform to hold it substantially level and free of ambient vibration, a light-weight electrically-conductive test table connected with the cone to provide vibrating motion for a test object or device seated thereon, means for applying a monitor signal to said test object or device, and means including a pancake type pickup coil mounted in close inductive coupling relation to the test table to derive a signal therefrom in response to vibrating movements thereof, and means connected with said coil to indicate the momentum of said movement.

References Cited

UNITED STATES PATENTS 3,020,751 2/1962 Wohl _____ 73—71.6
3,106,653 10/1963 Fowler _____ 73—71.6 XR RICHARD C. QUEISSER, *Primary Examiner.*

V. J. TOTH, *Assistant Examiner.*

U.S. Cl. X.R.

73—67